(12) United States Patent
Kahkonen et al.

(10) Patent No.: US 12,468,917 B2
(45) Date of Patent: Nov. 11, 2025

(54) CARD-LIKE DATA CARRIER, AND METHOD FOR DETACHING AN ADHESIVE CONNECTION FOR A CARD-LIKE DATA CARRIER

(71) Applicant: GIESECKE+DEVRIENT EPAYMENTS GMBH, Munich (DE)

(72) Inventors: Mikko Kahkonen, Munich (DE); Ashwini Pandey, Poing (DE); Thomas Tarantino, Laufen (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/694,485

(22) PCT Filed: Sep. 22, 2022

(86) PCT No.: PCT/EP2022/025441
§ 371 (c)(1),
(2) Date: Mar. 22, 2024

(87) PCT Pub. No.: WO2023/046320
PCT Pub. Date: Mar. 30, 2023

(65) Prior Publication Data
US 2024/0320460 A1 Sep. 26, 2024

(30) Foreign Application Priority Data
Sep. 23, 2021 (DE) .................. 10 2021 004 810.5

(51) Int. Cl.
*G06K 19/077* (2006.01)
(52) U.S. Cl.
CPC .............................. *G06K 19/0772* (2013.01)

(58) Field of Classification Search
CPC .. G06K 19/0772; G06K 19/00; G06K 19/067; G06K 19/07; G06K 19/07722; G06Q 20/34; G06Q 20/341
(Continued)

(56) References Cited

U.S. PATENT DOCUMENTS

2003/0047615 A1* 3/2003 Batoha ................ G06K 19/041
235/491
2003/0123994 A1* 7/2003 Weng .................... F04B 19/006
417/207
(Continued)

FOREIGN PATENT DOCUMENTS

DE 102008027771 A1 12/2009
EP 2409261 B1 6/2016
(Continued)

OTHER PUBLICATIONS

Kloss, Julia, "Klebereste entfernen: Die besten Hausmittel" (English: "Removing Glue Residues: The Best Home Remedies"), Utopia.de, Apr. 4, 2020, 8 pages.
(Continued)

*Primary Examiner* — Edwyn Labaze
(74) *Attorney, Agent, or Firm* — Workman Nydegger

(57) ABSTRACT

A card-like data carrier includes an electronic chip module with at least one chip and a contact structure, and a card body with an arrangement region for receiving the chip module. The chip module is arranged in the arrangement region of the card body and is connected to the card body by means of at least one adhesive, wherein the adhesive is configured to be releasable thermolytically in a predetermined temperature range and/or chemically in order to separate the connection between the chip module and the card body. A method is provided for releasing an adhesive connection for a card-like data carrier.

15 Claims, 2 Drawing Sheets

(58) Field of Classification Search
USPC .......................... 235/492, 488, 487, 380, 375
See application file for complete search history.

(56) References Cited

U.S. PATENT DOCUMENTS

| | | | |
|---|---|---|---|
| 2006/0237543 A1* | 10/2006 | Goto ................... | G06K 19/077 |
| | | | 235/492 |
| 2014/0242356 A1 | 8/2014 | Le Loarer | |
| 2015/0163903 A1* | 6/2015 | Wada ..................... | H05K 1/097 |
| | | | 361/760 |
| 2018/0281503 A1 | 10/2018 | Vu | |
| 2019/0073578 A1* | 3/2019 | Lowe ..................... | G06K 19/02 |
| 2023/0392292 A1* | 12/2023 | Park ........................ | C30B 29/68 |
| 2024/0001585 A1* | 1/2024 | Chanana .............. | B27K 3/0278 |

FOREIGN PATENT DOCUMENTS

| | | |
|---|---|---|
| EP | 3736738 A1 | 11/2020 |
| WO | 2012014112 A1 | 2/2012 |
| WO | 2012028299 A1 | 3/2012 |

OTHER PUBLICATIONS

German Search Report from corresponding German Patent Application No. DE102021004810.5, Apr. 4, 2022.
International Search Report from corresponding PCT Application No. PCT/EP2022/025441, Dec. 14, 2022.

* cited by examiner

CARD-LIKE DATA CARRIER, AND METHOD FOR DETACHING AN ADHESIVE CONNECTION FOR A CARD-LIKE DATA CARRIER

BACKGROUND

The present invention relates to a card-like data carrier and to a method for releasing an adhesive connection for a card-like data carrier.

For the production of card-like data carriers, for example smartcards, chip cards, integrated-circuit cards or identification cards, it is known from the prior art to use adhesives in order, for example, to connect the chip module, the chip or further components to the card body and therefore to produce an adhesive connection. Such adhesive connections may be greatly stressed during use of the smartcard, for which reason there is a demanding requirement for the adhesive connection in respect of mechanical strength and stability in relation to environmental influences in order to ensure reliable cohesion of the smartcard for a long time.

The effect of this is that the individual components can be separated from one another only with difficulty because of the robust adhesive connections. Since smartcards are produced from different materials, in particular from recyclable and nonrecyclable materials, it is however important to disassemble the smartcard into the individual components for the recycling process after the expiration date. Currently, however, there are scarcely any simply implementable methods for separating the individual components of the smartcard fully and cleanly in order to deliver them to the recycling process respectively required as a function of the material. For example, the smartcards are processed with a cutting tool or stamping tool or laser cutting in order to separate the individual components, although it is not entirely possible to ensure that the individual components can be separated cleanly and fully from one another. This may sometimes make the recycling process difficult. Nevertheless, the recycling of smartcards, in particular smartcards made of plastic, is gaining increasing importance from an environmentally friendly standpoint.

SUMMARY

It is therefore an object of the present invention to provide a card-like data carrier, in particular a smartcard, with which simple separation of the individual components from one another can be provided for an efficient and simplified recycling process. It is furthermore an object of the present invention to provide a method for releasing an adhesive connection for a card-like data carrier.

Embodiments and developments of the invention are specified in the dependent claims and disclosed with reference to the description and the figures. Features and details that are described in connection with the card-like data carrier according to the invention also apply in connection with the method according to the invention, and vice versa, so that cross-reference may always be made in respect of the disclosure of the individual aspects of the invention.

A first aspect of the invention provides a card-like data carrier, in particular a smartcard, which comprises an electronic chip module with at least one chip and a contact structure, and a card body with an arrangement region for receiving the chip module, wherein the chip module is arranged in the arrangement region of the card body and is connected to the card body by means of at least one adhesive, wherein the adhesive is configured to be releasable thermolytically in a predetermined temperature range and/or chemically in order to separate the connection between the chip module and the card body.

In the scope of the application, the chip module comprises at least one chip and a contact structure. Contact-based data transmission can therefore be established between the smartcard and a reader. In particular, the chip is in this case preferably connected to contacts of the contact structure by means of wires. The contacts may be defined in their number, size and position by international standards so that the function of the smartcard can be ensured in any reader. Further components may however be provided for the chip module, for example a capacitor or an antenna (as a coil) for capacitive or inductive contactless data transmission. A contactless smartcard may communicate with a reader by electromagnetic waves, in which case the smartcard may function in a similar way to a transmission and reception device. In particular, electromagnetic waves emitted by the reader generate an oscillating electromagnetic field which, for example, generates an oscillating electrical voltage in the coil or antenna of the chip module so that the chip can be supplied with power. The oscillations of the voltage may be detected as a signal and converted into data in the chip. These data may in turn be processed in the chip and converted into variations of the electromagnetic field, which may in turn be detected by the reader and converted into data. Overall, the chip may therefore allow contact-based and/or contactless data transmission.

Furthermore, in the scope of the application, the adhesive is configured to be thermolytically releasable in a predetermined temperature range. This, for example, is intended to mean that the chemical structure of the adhesive can be irreversibly modified so that it loses its bonding properties. In other words, the binding forces of the adhesive are released and the connection between the chip module and the card body is therefore separated. This takes place in particular under an external influence, for example supplying heat, for example supplying infrared radiation. In the scope of the application, the term "thermolytically" refers in particular to a temperature change, for example a temperature increase or a temperature decrease in a predetermined temperature range. Alternatively, a chemical external influence may be provided, for example supplying an acid or alkali so that the adhesive is chemically released and the chemical structure of the adhesive is likewise irreversibly modified. The adhesive according to the invention may preferably be used to connect various components of the smartcard to one another. For example, the same adhesive, in particular the same adhesive material, may also be used to connect a hologram and/or a magnetic strip to the card body. In other words, the same adhesive may be used several times in order to connect the various components to the smartcard. Alternatively, different adhesive materials may be used to connect the individual components, each adhesive material having however the property of thermolytic release in a predetermined temperature range and/or chemical release.

The invention has the advantage that the connection of the individual components, for example the chip module and the card body, can be separated simply and fully because of the release of the adhesive. In particular, this simplifies the process of recycling the smartcard since the individual components are separated cleanly from one another and can be recycled efficiently according to their material composition. In particular, the separation of the chip module from the card body may be provided particularly simply and elaborate cutting or stamping of the chip module with possible residues of the adhesive may be obviated. Preferably, for example, polymer adhesives that do not have a very high thermal stability may be used. For example, polyurethane adhesives may be envisioned. Alternatively, the use of natural rubber as an adhesive would also be conceivable.

Preferably, the predetermined temperature range has a temperature of at least +50° C., preferably +60° C., and/or at most −15° C., preferably −20° C. In particular, a temperature range is provided without the stability of the adhesive connection in everyday use of the smartcard being jeopardized. Ideally, however, the adhesive does not have a very high thermal stability at very high or very low temperatures. For example, the adhesive may be released and separate the individual components of the smartcard from one another when the adhesive is exposed to a temperature of +60° C. Examples of adhesives that may be envisioned for this would be natural rubber with a thermal stability of up to about +65° C. or acrylate adhesives with a thermal stability of between approximately −15° C. and +60° C. For example, the smartcard may be exposed to a heat treatment in the predetermined temperature range in a recycling apparatus so that the adhesive is released and the individual components of the smartcard can be sorted and processed further for the individual material-dependent recycling process.

Alternatively or in addition, the adhesive may be configured to be chemically releasable by using a chemical and/or acid and/or salt water. For example, it is also conceivable for the adhesive to be releasable by using a solvent or an alkali. In this case, for example, it is conceivable to use natural rubber, which only has a limited stability in relation to chemicals or solvents, as the adhesive. In particular, an adhesive that is configured to be releasable by using an uncommon chemical may preferably be used, so that reliable usage of the smartcard in daily use is ensured. Furthermore preferably, a chemical that does not have harmful environmental effects is used for releasing the adhesive, so that the recycling process is not detrimentally influenced by using the chemical. For example, the smartcard may be exposed to a chemical treatment with an acid in a recycling apparatus so that the adhesive is released and the individual components of the smartcard can be sorted and processed further for the individual material-dependent recycling process. In this case, it is conceivable for the acid to be sprayed onto the smartcard or for the smartcard to be dipped into the acid.

In one preferred embodiment, the adhesive may be configured to be biologically degradable. In particular, this increases the efficiency of the recycling process and constitutes a very environmentally friendly use.

Preferably, the arrangement region may be configured as a recess in the card body, the chip module being arranged in the recess and connected to the card body by means of the adhesive. In particular, for this purpose a cavity may for example be generated as a recess in the card body, for example by milling. The chip module may then be adhesively bonded into this cavity with the adhesive and kept protected in the card body. Forming the recess in the card body is suitable particularly for smartcards with contact-based data transmission. For example, the chip module may be partially or fully embedded in the adhesive and adhesively bonded, or arranged, in the recess of the card body by means of the adhesive. In other words, the adhesive is arranged, in particular fully, between the chip module and the card body.

Alternatively or in addition, the card-like data carrier may furthermore comprise a magnetic strip which is arranged on a surface of the card body, the magnetic strip being connected to the card body by means of the adhesive. In other words, the adhesive is arranged between the magnetic strip and the surface of the card body, the adhesive extending at least partially, in particular fully, along the magnetic strip. The use of a magnetic strip constitutes a security feature and ensures automatic identification of authorized persons.

In particular, the magnetic strip as a component of the smartcard may be separated easily and fully from the card body because of the use of the thermolytically and/or chemically releasable adhesive. This increases the efficiency for the recycling process since the individual components of the smartcard can be separated easily from one another.

In one preferred embodiment, the card-like data carrier may furthermore comprise at least one hologram which is arranged on a surface of the card body, the hologram being connected to the card body by means of the adhesive. In other words, the adhesive is arranged between the hologram and the surface of the card body. The use of a hologram constitutes a further security feature, which further increases the protection of the smartcard against forgery. In this case as well, the hologram as a further component of the smartcard may be separated easily and fully from the card body because of the adhesive.

Preferably, the card body may be formed from at least two layers, the layers being connected to one another by means of the adhesive. In other words, the adhesive is arranged between the layers. Preferably, a multiplicity of layers may also be provided for the card body, the adhesive respectively being arranged between the individual layers in order to connect the layers. Particular functions may advantageously be produced in the card body by means of the layers, in which case the layers may for example be configured as design layers or transparent cover layers, etc. Advantageously, the layers may be separated easily and fully from one another because of the adhesive.

Alternatively or in addition, the adhesive may extend at least partially, in particular fully, along the layers. Preferably, the adhesive extends along the entire length of the layers so that the bonding or connection between the layers is increased.

In one preferred embodiment, the card body may have at least one antenna for contactless data transmission. The antenna may preferably be configured as a coil for inductive contactless data transmission, which is coupled with the chip. For example, the antenna may be integrated in a layer of the card body. Alternatively, it is also conceivable for the coil to be integrated into the adhesive.

Preferably, the chip module may be configured as a functional layer, the functional layer being arranged, in particular fully, on a surface as an arrangement region of the card body, the functional layer being connected to the card body by means of the adhesive. Advantageously, the functional layer may have at least one antenna and at least one hologram. In other words, in particular the chip, the hologram, the antenna and the contact structure are integrated in the functional layer. The recycling process may thereby be further simplified because it is crucially only necessary to separate the functional layer from the card body. As an alternative in this case, the functional layer may be separated from the card body by a stamping process and, for example, delivered to a separate recycling process.

A second aspect of the invention provides a method for releasing an adhesive connection for a card-like data carrier, in particular for a smartcard, which comprises an electronic chip module with at least one chip and a contact structure, and a card body with an arrangement region for receiving the chip module, wherein the chip module is arranged in the arrangement region of the card body and is connected to the card body by means of at least one adhesive, wherein the method comprises the following steps:

providing the card-like data carrier and thermolytically releasing the adhesive in a predetermined temperature range and/or chemically releasing the adhesive in order to separate the connection between the chip module and the card body.

Preferably, the adhesive may in this case be released both thermolytically and at the same time chemically. This may for example be done in a recycling apparatus, an acid being applied at a particular temperature onto the smartcard.

Consequently, the method according to the invention has the same advantages as have been explained in relation to the card-like data body according to the invention.

BRIEF DESCRIPTION OF THE DRAWINGS

The present invention will be described below with reference to the appended figures by way of example in the scope of exemplary embodiments. Individual features of the embodiments may of course be freely combined with one another, insofar as is technically expedient, without departing from the scope of the present invention. Elements with the same function and effect are provided with the same reference signs in the figures. In the figures below, schematically.

DETAILED DESCRIPTION OF VARIOUS EMBODIMENTS

Figure 1:
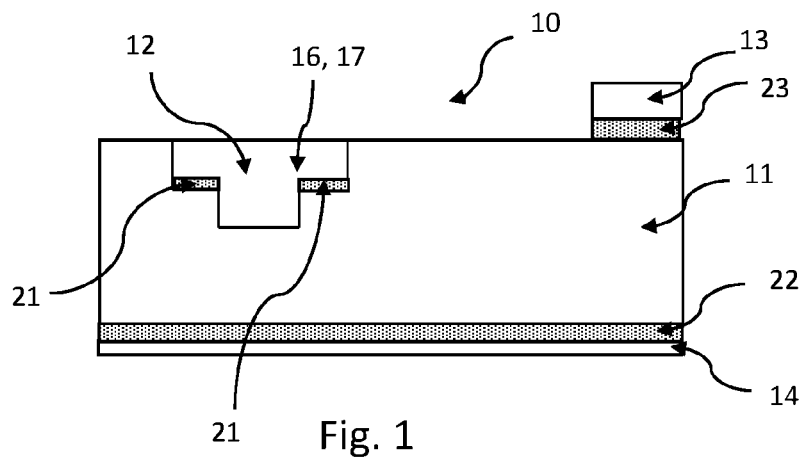
FIG. 1 shows a sectional view of a card-like data carrier according to one exemplary embodiment of the invention.

FIG. 1 shows a sectional view of a card-like data carrier 10 according to one exemplary embodiment of the invention. The card-like data carrier 10, in particular a smartcard, comprises an electronic chip module 12 and a card body 11 with an arrangement region 16 for receiving the chip module 12. The card body 11 is preferably formed from a plastic material.

The chip module 12 has a chip (not represented) and a contact structure. Contact-based data transmission can therefore be established between the smartcard and a reader. In particular, the chip is in this case preferably connected to contacts of the contact structure by means of wires, the contacts being defined by international standards.

The chip module 12 is arranged in the arrangement region 16 of the card body and is connected to the card body 11 by means of an adhesive 21. In order to separate the connection between the chip module 12 and the card body 11, the adhesive 21 is configured to be releasable thermolytically in a predetermined temperature range and/or chemically. This is intended to mean, for example, that the chemical structure of the adhesive 21 can be irreversibly modified so that it loses its bonding properties, in order that the connection between the chip module 12 and the card body 11 can be separated. This takes place in particular under an external influence, for example supplying heat, or under a chemical external influence, for example supplying an acid or alkali. Advantageously, the connection of the individual components can be separated particularly simply and fully because of the release of the adhesive 21. In particular, this simplifies the process of recycling the smartcard.

For example, a recess 17, in particular a milled cavity, is formed in the card body 11 in the arrangement region 16, the chip module 12 being arranged in the recess 17 and being connected to the card body 11 by means of the adhesive 21.

In particular, the chip module 12 is partially embedded into the adhesive 21 on two sides. In other words, the adhesive 21 is arranged between the chip module 12 and the card body 11.

The card-like data carrier 10 furthermore comprises a magnetic strip 14 which is arranged on a lower surface, in particular on a rear side, of the card body 11, the magnetic strip 14 being connected to the card body 11 by means of a second adhesive 22. In other words, the second adhesive 22 is arranged between the magnetic strip 14 and the surface of the card body 11, the second adhesive 22 extending fully along the magnetic strip 14. Like the first adhesive 21, in order to separate the connection between the magnetic strip 14 and the card body 11, the second adhesive is configured to be releasable thermolytically in a predetermined temperature range and/or chemically. In particular, the second adhesive 22 and the first adhesive 21 are the same.

The card-like data carrier 10 furthermore comprises a hologram 13 which is arranged on an upper surface of the card body 11, in particular on a front side of the card body 11, the hologram 13 being connected to the card body 11 by means of a third adhesive 23. In other words, the third adhesive 23 is arranged between the hologram 13 and the surface of the card body 11. Like the first adhesive 21, in order to separate the connection between the hologram 13 and the card body 11, the third adhesive 23 is configured to be releasable thermolytically in a predetermined temperature range and/or chemically. In particular, the third adhesive 23 and the first adhesive 21 are the same.

Overall, the individual components of the card-like data carrier 10, for example the chip module 12, the hologram 13, the magnetic strip 14 and the card body 11, can be separated particularly simply and fully from one another because of the use of the releasable adhesives 21, 22, 23.

Figure 2:
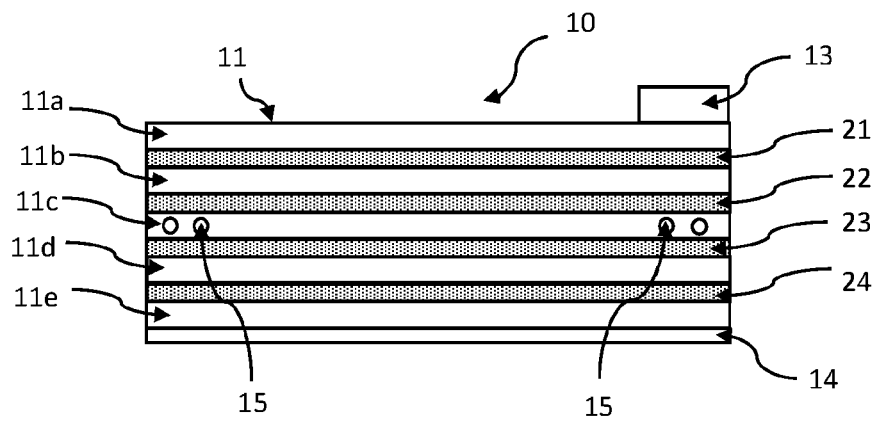
FIG. 2 shows a sectional view of a card-like data carrier according to a further exemplary embodiment of the invention.

FIG. 2 shows a sectional view of a card-like data carrier 10 according to a further exemplary embodiment of the invention. The card-like data carrier 10, in particular a smartcard, comprises an electronic chip module (not represented for the sake of clarity) with at least one chip and a contact structure, and a card body 11 with an arrangement region (not represented) for receiving the chip module. The chip module is arranged in the arrangement region of the card body 11 and is connected to the card body 11 by means of at least one adhesive. In a similar way to FIG. 1, the adhesive is configured to be releasable thermolytically in a predetermined temperature range and/or chemically in order to separate the connection between the chip module and the card body.

In FIG. 2, the card body 11 is formed from five layers, namely a first layer 11a, a second layer 11b, a third layer 11c, a fourth layer 11d and a fifth layer 11e. The layers 11a,b,c,d,e are respectively connected to one another by means of an adhesive. For example, a first adhesive 21 is arranged between the first layer 11a and the second layer 11b, the first adhesive 21 extending along the entire length of the layers 11a,b. Furthermore, a second adhesive 22 is arranged between the second layer 11b and the third layer 11c and extends between the entire length of the layers 11b,c. Furthermore, a third adhesive 23 is arranged between the third layer 11c and the fourth layer 11d and extends between the entire length of the layers 11c,d. Furthermore, a fourth adhesive 24 is arranged between the fourth layer 11d and the fifth layer 11e and extends between the entire length of the layers 11d,e. For example, the adhesives 21, 22, 23, 24 are the same and can be released thermolytically in a predetermined temperature range and/or chemically.

By means of the layers 11a,b,c,d,e, particular functions may advantageously be produced in the card body 11. For example, the layers 11a,b,c,d,e are formed as plastic layers. A hologram 13 is arranged on the first layer 11a, which may for example be regarded as a design layer. For example, a magnetic strip 14 is arranged on the fifth layer 11e. For example, an antenna 15 is integrated in the central layer 11c. The antenna 15 is for example configured as a coil, and for illustration is represented by the circles. The antenna 15 is coupled with the chip module (not represented), and inductive contactless data transmission may be made possible by means of the antenna 15. For example, the antenna 15 runs along the edges of the third layer 11c as the central layer. Because of the connection of the layers 11a,b, c,d,e by means of the releasable adhesives 21, 22, 23, 24, the layers 11a,b,c,d,e can be separated simply and fully from one another. The recycling process may thereby be carried out efficiently and simply.

Figure 3:
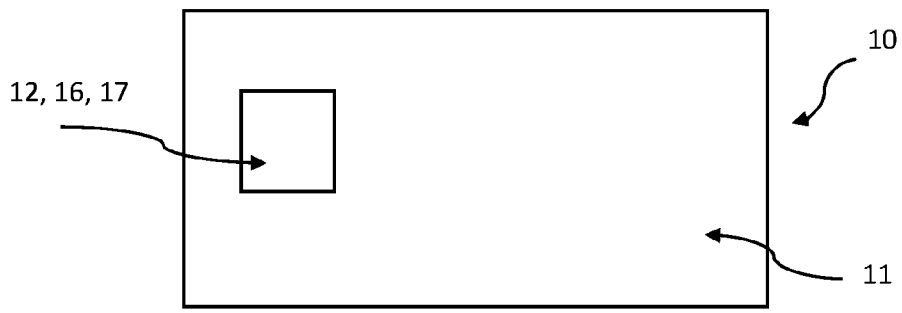
FIG. 3 shows a plan view of a card-like data carrier according to a third exemplary embodiment of the invention.

FIG. 3 shows a plan view of a card-like data carrier 10, in particular a smartcard, according to a third exemplary embodiment of the invention. The card-like data carrier 10 comprises an electronic chip module 12 and a card body 11 with an arrangement region 16 for receiving the chip module 12, the chip module 12 being arranged in the arrangement region 16 of the card body 11 and being connected to the card body 11 by means of at least one adhesive (not represented). In a similar way to FIG. 1, the arrangement region 16 may be configured as a recess 17, in particular a milled cavity, in the card body 11, the chip module 12 being arranged in the recess 17 and being connected to the card body 11 by means of the adhesive. In order to separate the connection between the chip module 12 and the card body 11, the adhesive is configured to be releasable thermolytically in a predetermined temperature range and/or chemically.

The chip module 12 according to FIG. 3 is configured as a functional module and comprises a chip (not represented), a contact structure (not represented) and further components (not represented), for example a hologram and an antenna. Consequently, both contact-based and contactless data transmission may be made possible by means of the functional module. By the chip module 12 being configured as a functional module, the recycling process can be further simplified since it is then only necessary to separate the functional module from the card body 11. This can be done by releasing the adhesive, so that easy and full separation of the functional module and the card body 11 can take place. Alternatively, it is also conceivable that the functional module may be separated from the card body 11 by a stamping process and may be recycled separately.

Figure 4:
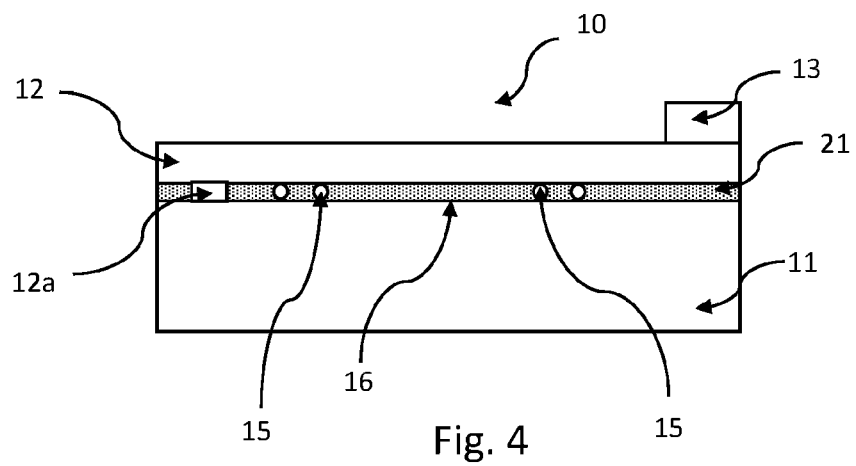
FIG. 4 shows a sectional view of a card-like data carrier according to a fourth exemplary embodiment of the invention.

FIG. 4 shows a sectional view of a card-like data carrier 10 according to a fourth exemplary embodiment of the invention. The card-like data carrier 10, in particular a smartcard, comprises an electronic chip module 12 with a chip 12a and a contact structure (not represented), and a card body 11 with an arrangement region 16 for receiving the chip module 12. The chip module 12 is arranged in the arrangement region 16 of the card body 11, the arrangement region 16 being configured as a surface of the card body 11. The chip module 12 is connected to the card body 11 by means of an adhesive 21. In other words, the adhesive 21 is arranged between the chip module 12 and the surface of the card body 11. In order to separate the connection between the chip module 12 and the card body 11, the adhesive 21 is configured to be releasable thermolytically in a predetermined temperature range and/or chemically.

In FIG. 4, the chip module 12 is configured for example as a functional layer, the functional layer being arranged fully on the surface as an arrangement region 16 of the card body 11, the functional layer being connected to the card body 11 by means of the adhesive 21. The functional layer furthermore comprises an antenna 15 and a hologram 13. The hologram 13 is arranged for example on a surface of the functional layer. The chip 12a is arranged on the face opposite to the hologram 13, in particular the lower side, of the functional layer. For example, the chip 12a is integrated into the adhesive 21 and is therefore kept protected. The antenna 15 is for example integrated into the adhesive 21 and coupled (in a manner not represented) with the chip 12a for contactless data transmission. By the chip module 12 being configured as a functional layer, the recycling process can be further simplified because it is crucially only necessary to separate the functional layer from the card body 11 by means of the adhesive 21.

Figure 5:
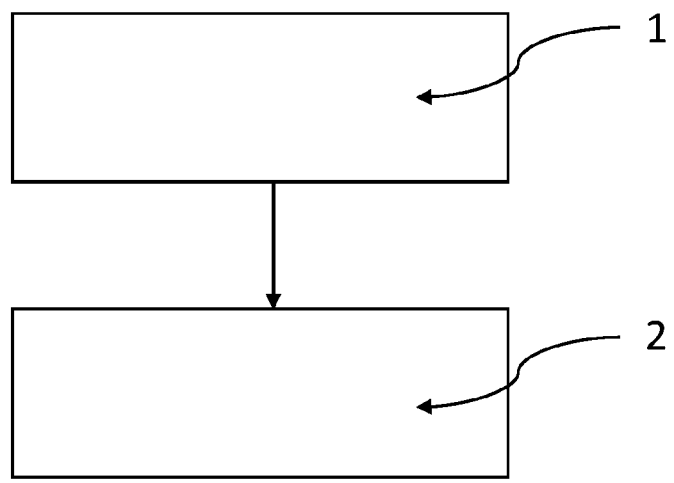
FIG. 5 shows a schematic view of a method according to the invention for releasing an adhesive connection.

FIG. 5 is a schematic view of a method according to the invention for releasing an adhesive connection for a card-like data carrier, in particular for a smartcard, which comprises an electronic chip module with at least one chip and a contact structure, and a card body with an arrangement region for receiving the chip module, the chip module being arranged in the arrangement region of the card body and being connected to the card body by means of at least one adhesive, the method having the following steps:
  providing the card-like data carrier and
  thermolytically releasing the adhesive in a predetermined temperature range and/or chemically releasing the adhesive in order to separate the connection between the chip module and the card body.

Preferably, further components of the card-like data carrier, for example a hologram or a magnetic strip, may be connected to the card body by means of the adhesive and therefore released thermolytically in a predetermined temperature range or chemically. By the adhesive being released, the individual components of the card-like data carrier can be separated simply and fully from one another.

The invention claimed is:

1. A card-like data carrier comprising an electronic chip module with at least one chip and a contact structure, and a card body with an arrangement region for receiving the chip module,
  wherein the chip module is arranged in the arrangement region of the card body and is connected to the card body by means of at least one adhesive,
  wherein the adhesive includes an irreversibly modifiable chemical structure and is configured to be releasable thermolytically in a predetermined temperature range and/or chemically by releasing binding forces to separate the connection between the chip module and the card body.

2. The card-like data carrier according to claim 1, wherein the predetermined temperature range has a temperature of at least +50° C.

3. The card-like data carrier of claim 2, wherein the at least one adhesive includes an acrylate adhesive with a thermal stability of at most −15° C. in the predetermined temperature range.

4. The card-like data carrier according to claim 1, wherein the adhesive is configured to be chemically releasable by using a chemical and/or acid and/or salt water.

5. The card-like data carrier according to claim 1, wherein the adhesive is configured to be biologically degradable.

6. The card-like data carrier according to claim 1, wherein the arrangement region is configured as a recess in the card body, the chip module being arranged in the recess and connected to the card body by means of the adhesive.

7. The card-like data carrier according to claim 1, wherein the card-like data carrier furthermore comprises a magnetic strip which is arranged on a surface of the card body, the magnetic strip being connected to the card body by means of the adhesive.

8. The card-like data carrier according to claim 1, wherein the card-like data carrier furthermore comprises at least one hologram which is arranged on a surface of the card body, the hologram being connected to the card body by means of the adhesive.

9. The card-like data carrier according to claim 1, wherein the card body is formed from at least two layers, the layers being connected to one another by means of the adhesive.

10. The card-like data carrier according to claim 9, wherein the adhesive extends at least partially along the layers.

11. The card-like data carrier according to claim 1, wherein the card body has at least one antenna for contactless data transmission.

12. The card-like data carrier according to claim 1, wherein the chip module is configured as a functional layer, the functional layer being arranged on a surface as an arrangement region of the card body, the functional layer being connected to the card body by means of the adhesive.

13. The card-like data carrier according to claim 12, wherein the functional layer has at least one antenna and at least one hologram.

14. A method for releasing an adhesive connection for a card-like data carrier which comprises an electronic chip module with at least one chip and a contact structure, and a card body with an arrangement region for receiving the chip module,
wherein the chip module is arranged in the arrangement region of the card body and is connected to the card body by means of at least one adhesive having an irreversibly modifiable chemical structure,
wherein the method comprises the following steps:
providing the card-like data carrier and
thermolytically releasing the adhesive in a predetermined temperature range and/or chemically releasing the adhesive by releasing binding forces to separate the connection between the chip module and the card body.

15. The method according to claim 14, further comprising the step of subjecting the card-like data carrier to an external thermal influence of a temperature change and/or to an external chemical influence of irreversible modification.

* * * * *